(12) United States Patent
Staddon et al.

(10) Patent No.: US 8,996,631 B1
(45) Date of Patent: Mar. 31, 2015

(54) CUSTOMIZING ANNOTATIONS FOR ONLINE CONTENT

(75) Inventors: Jessica Staddon, Redwood City, CA (US); Andrew Tomkins, San Jose, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 13/470,135

(22) Filed: May 11, 2012

Related U.S. Application Data

(60) Provisional application No. 61/486,111, filed on May 13, 2011.

(51) Int. Cl.
 *G06F 15/173* (2006.01)
 *H04L 9/32* (2006.01)

(52) U.S. Cl.
 CPC .................................. *H04L 9/3271* (2013.01)
 USPC ............................ 709/206; 709/200; 709/223

(58) Field of Classification Search
 USPC .......................................... 709/200, 206, 224
 See application file for complete search history.

(56) References Cited

U.S. PATENT DOCUMENTS

| | | | | |
|---|---|---|---|---|
| 7,904,337 | B2* | 3/2011 | Morsa | 705/14.71 |
| 8,135,800 | B1* | 3/2012 | Walsh et al. | 709/217 |
| 8,725,858 | B1* | 5/2014 | Wu et al. | 709/223 |
| 2004/0075686 | A1* | 4/2004 | Watler et al. | 345/749 |
| 2006/0143568 | A1* | 6/2006 | Milener et al. | 715/738 |
| 2008/0133657 | A1* | 6/2008 | Pennington | 709/204 |
| 2008/0209350 | A1* | 8/2008 | Sobotka et al. | 715/762 |
| 2009/0303253 | A1* | 12/2009 | Flake et al. | 345/660 |
| 2011/0055017 | A1* | 3/2011 | Solomon et al. | 705/14.66 |
| 2011/0173337 | A1* | 7/2011 | Walsh et al. | 709/229 |
| 2011/0302152 | A1* | 12/2011 | Boyd et al. | 707/722 |
| 2012/0159334 | A1* | 6/2012 | Messerly et al. | 715/733 |
| 2012/0233256 | A1* | 9/2012 | Shaham et al. | 709/204 |
| 2012/0259919 | A1* | 10/2012 | Yan et al. | 709/204 |
| 2012/0296971 | A1* | 11/2012 | Brown | 709/204 |
| 2013/0013699 | A1* | 1/2013 | Huxley | 709/206 |
| 2013/0030919 | A1* | 1/2013 | Brinson et al. | 705/14.58 |
| 2013/0132863 | A1* | 5/2013 | Lansford et al. | 715/753 |
| 2013/0151602 | A1* | 6/2013 | McClelland et al. | 709/204 |
| 2013/0151610 | A1* | 6/2013 | Schoen et al. | 709/204 |
| 2013/0246323 | A1* | 9/2013 | Athas et al. | 706/46 |
| 2013/0339109 | A1* | 12/2013 | Steelberg | 705/14.1 |
| 2014/0013353 | A1* | 1/2014 | Mathur | 725/34 |
| 2014/0022096 | A1* | 1/2014 | Agarwal | 340/995.27 |
| 2014/0108954 | A1* | 4/2014 | Tonse et al. | 715/747 |
| 2014/0108964 | A1* | 4/2014 | Liyanage et al. | 715/753 |

\* cited by examiner

*Primary Examiner* — Anthony Mejia
(74) *Attorney, Agent, or Firm* — Patent Law Works LLP

(57) ABSTRACT

A computer-implemented method for customizing a user display is disclosed. A user is identified based on user-provided information or user activity. The user's sharing activity is determined. A user type is identified based at least in part on the user's sharing activity and associated with the user. The user type is one of two or more user types related to a measure of the user's sharing activity. One or more of a content item and an annotation displayed to the user is customized based at least in part on the user's user type.

19 Claims, 10 Drawing Sheets

CUSTOMIZING ANNOTATIONS FOR ONLINE CONTENT

This application claims the benefit under 35 U.S.C. §119 (e) of U.S. Patent Application No. 61/486,111, entitled "Annotated News Articles and Lurker Engagement" filed May 13, 2011, the entire contents of which are incorporated herein by reference.

BACKGROUND

Publishers of online content have found it increasingly important to not only direct users to the content they publish, but also to increase user engagement with the content published. For example, a publisher does not simply want a user to read an article (content) on its website it wants the user to share, e-mail, bookmark, blog about, indicate approval of and otherwise further engage with the article.

Since visual real-estate is finite on a user's display it is desirable to determine what to display to a user and how to display it in order to maximize that user's engagement. Content that is published online is often associated with an annotation. The annotation indicates the popularity of the content, for example, the annotation shows a user how many times consumers of the content indicated a preference for, interest in, approved of or endorsed the content. Current systems will display content to a user based on the content's popularity as measured by the annotation. However, such systems do not account for differences in the user's sharing activity, e.g., how often the user indicates approval; posts, reposts or embeds content on a blog or micro blog; and sends, or forwards, content via e-mail or other digital message system, when displaying content. For example, assume the same article will be displayed in the same manner to both User A, who frequently shares content he/she views, and User B, who typically only views content without further interaction or sharing. Consequently, such a system fails to optimize the display of content items based at least in part on the user's online activity. For example, current systems fail to recognize that based on User A's sharing activities, User A's levels of engagement may be relatively unaffected by annotations, i.e., User A is not more likely to share, e-mail, bookmark, blog about, indicate approval of and otherwise further engage with content associated with a favorable annotation. Therefore, the display real-estate occupied by the annotation is not going to its highest use, and the service provider would be better off displaying something else to User A to increase user engagement or displaying an advertisement to generate greater ad revenue. However, based on User B's sharing activities, User B's engagement level may be affected by annotations, i.e., User B is more likely to engage with content associated with a favorable annotation; therefore, displaying favorable annotations to User B is advantageous.

Since current systems fail to distinguish between Users A & B, the current systems also do not customize the display of annotations based on the differences in sharing activity between the two users. For example, the current systems do not display the annotation more prominently to User B, who may be more affected by annotations, and less prominently (if at all) to User A, who may be less affected by the annotation. Moreover, current systems do not customize the content displayed to Users A & B or the order of its display. For example, the content with the most favorable annotation is not displayed to User B, and content based at least in part on criteria other than the favorability of the annotation (or a different type of annotation) is not displayed to User A. The failure of the current systems to customize the display of content items and/or annotations based at least in part on the user's sharing activity undermines the goal of content providers to maximize user engagement.

SUMMARY

The specification relates to published online content, particularly to customizing the display of a content item, e.g., an annotation, based at least in part on a user's sharing activity. According to one innovative aspect of the subject matter described in this disclosure, may be embodied in methods that include identifying user based on user-provided information or user activity; determining the user's sharing activity; identifying a user type based at least in part on the user's sharing activity, wherein the user type is one of two or more user types related to a measure of the user's sharing activity; and customizing one or more of a content item and an annotation displayed to the user is customized based at least in part on the user's user type.

According to one innovative aspect of the subject matter described in this disclosure, a system includes a processor and at least one module, executable by the processor. The module includes instructions for the following: identifying a user based on user-provided information or user activity; determining the user's sharing activity; identify a user type based at least in part on the user's sharing activity and associate the user type with the user; and customizing one or more of a content item and an annotation displayed to the user based at least in part on the user's user type. The user type is one of two or more user types related to a measure of the user's sharing activity.

Other implementations of one or more of these aspects include corresponding systems, apparatus, and computer programs, configured to perform the actions of the methods, encoded on computer storage devices.

These and other implementations may each optionally include one or more of the following features. The user-provided information or user activity comprises the user successfully logging into an account and the user is identified as the account's owner. The user-provided information or user activity includes one or more of the user's IP address, the device ID of the user's computing device, the user's browser history and the user's search history. The user's sharing activity is one or more of the user's indications of interest; posting, reposting or embedding content on a blog or micro blog; and sending, or forwarding, content via e-mail or other digital messaging system. The user's sharing activity is determined at least in part by the user's responses to a questionnaire. The user's sharing activity is determined at least in part by the user's online activity, which is determined and analyzed. The measure of the user's sharing activity is frequency of sharing activity, and the user type is one of two or more user types related to the frequency of the user's sharing activity. The two or more user types related to the frequency of the user's sharing activity comprise a frequent sharer type and an infrequent sharer type.

These and other implementations may each optionally include further operations including one or more of the following operations. Applying a threshold test to the user's sharing activity and associating the user with the type based at least in part on the measure of the user's sharing activity and responsive to the result of the threshold test. Displaying, or not displaying, a content item to the user based in part on the annotation, or lack of annotation, associated with the content item; modifying the display order of content items; and modifying the display of an annotation to increase, or decrease, the annotation's visual impact when displayed to the user.

The present disclosure is particularly advantageous because it provides a system and method for customizing the display of a content item, e.g., an annotations based on a user's sharing activity, which may beneficially increase user engagement with the associated content item.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
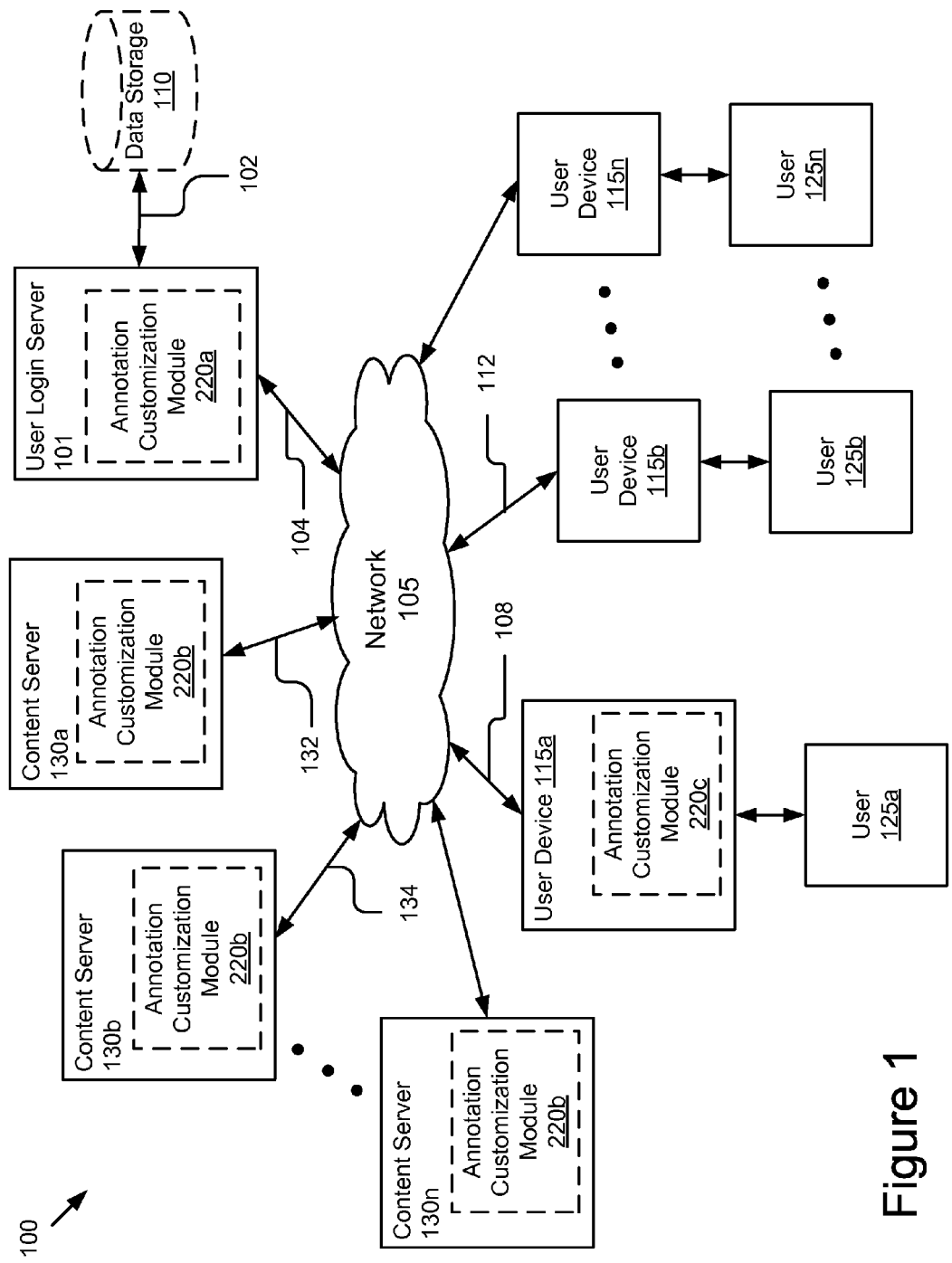
FIG. 1 illustrates a block diagram of an example system for customizing the display of a content item, e.g. an annotation, based at least in part on a user's sharing activity according to one implementation.

A system and method for customizing the display of a content item, e.g., an annotation, based at least in part on a user's sharing activity is described. In the following description, for purposes of explanation, numerous specific details are set forth in order to provide a thorough understanding. It will be recognized that the implementations can be practiced without these specific details. In other instances, structures and devices are shown in block diagram form in order to avoid obscuring the implementations. For example, one implementation is described below with reference to user interfaces and particular hardware. However, the implementations apply to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. A preferred implementation is implemented in software, which includes but is not limited to firmware, resident software, microcode, etc.

Furthermore, one implementation can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be obtained from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings as described herein.

FIG. 1 illustrates an example block diagram of a system 100 for customizing the display of a content item, e.g. an annotation, based at least in part on a user's sharing activity according to one implementation. The illustrated implementation of the system 100 for customizing the display of a content item, e.g., an annotation, based at least in part on a user's sharing activity includes user devices 115a, 115b, 115n (referred to individually or collectively as user device 115) that are accessed by users 125a, 125b, 125n (referred to individually or collectively as user 125), a user login server 101 and content servers 130a, 130b, 130n (referred to individually or collectively as content server 130). In the illustrated implementation, these entities are communicatively coupled via a network 105. Although only three devices are illustrated, it will be recognized that any number of user devices 115n are available to any number of users 125n. Further, although only three content servers 130 are illustrated, persons of ordinary skill in the art will recognize that any number of content servers 130n are available.

The user devices 115 and content servers 130 in FIG. 1 are used by way of example. While FIG. 1 illustrates three devices, the implementation applies to any system architecture having one or more user devices 115 and one or more content servers 130. Furthermore, while only one network 105 is coupled to the user devices 115, the user login server 101 and the content servers 130, in practice any number of networks 105 can be connected to the entities.

Although only one user login server 101 is shown, it will be recognized that multiple servers may be present. In one implementation, the user login server 101 contains a social network module 209 (not shown) and is part of a social network. A social network may be any type of social structure where the users are connected by a common feature. Examples include, but are not limited to blogs, micro blogs, and Internet forums. The common feature includes friendship, family, a common interest, etc. In one implementation, the user login server 101 contains a messaging module 210 (not shown) and is part of a messaging network, e.g., an e-mail network. In one implementation, the user login server 101 is associated with one or more content servers 130 accessible only to authorized users. For example, a subscription based news website where a user can only access the full content (e.g., news articles) of the content server 130 after successfully logging into the user login server 101. In one implementation, the user login server 101 belongs to a video hosting website. It will be recognized that the preceding examples are not intended to be an exhaustive list, and the user login server 101 could be part of other or different online systems and/or entities.

The network 105 enables communications between user devices 115, the user login server 101 and content servers 130. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one implementation, the network 105 is an IP-based wide or metropolitan area network.

In some implementations, the network 105 helps to form a set of online relationships between users 125, such as provided by one or more social networking systems, including explicitly-defined relationships and relationships implied by social connections with other online users, where the relationships form a social graph. In some examples, the social graph can reflect a mapping of these users and how they are related.

In one implementation, an annotation customization module 220a may be included in the user login server 101 and may be operable on the user login server 101. In another implementation, an annotation customization module 220b may be included in the content server 130 and may be operable on the content server 130. In another implementation, an annotation customization module 220c may be included in the user device 115 and may be operable on the user device 115. It will be recognized that the annotation customization module 220 can be stored in any combination on the devices and servers. In some implementations the sharing settings prediction module 220a/220b/220c (referred to individually or collectively as annotation customization module 220) includes multiple, distributed modules that cooperate with each other to perform the functions described below. Details describing the functionality and components of the annotation customization module 220 are explained in further detail below with regard to FIG. 3.

In the illustrated implementation, the user devices 115a and 115b are coupled to the network 105 via signal lines 108 and 112, respectively. The user 125a interacts with the user device 115a. Similarly, the user device 115b is coupled to the network via signal line 112. The user 125b interacts with the user device 115b. The user login server 101 is communicatively coupled to the network 105 via signal line 104. In one implementation, the user login server 101 is communicatively coupled to data storage 110 via signal line 102. The user application servers 130a, 130b are coupled to the network 105 via signal lines 132, 134, respectively.

In one implementation, data storage 110 stores data and information of users 125 of the system 100. Such stored information includes user profiles and other information identifying the users 125 of the system 100. Examples of information identifying users includes, but is not limited to, the user's name, contact information, sex, relationship status, likes, interests, links, education and employment history, location, political views, and religion. In one implementation, a user profile includes the user's list of current and past contacts and the user's online activities within the system 100, such as sharing activity. In another implementation, which is discussed below, a storage device 214 (see FIG. 2) is included in the user login server 101 and the storage device 214 stores the data and information of users 125 of the system 100.

In one implementation, the user device 115 is an electronic device having a web browser for interacting with the user login server 101 or content server 130 via the network 105 and is used by user 125 to access information in the system 100. The user device 115 can be, for example, a laptop computer, a desktop computer, a tablet computer, a mobile telephone, a personal digital assistant (PDA), a mobile email device, a portable game player, a portable music player or any other electronic device capable of accessing a network.

In one implementation, the content servers 130 are servers that provide various content items. Specifically, the content servers 130 are servers that enable users of the system 100 to access content within the system 100. For example, content servers 130 are servers that provide access to content such as the following: videos; articles; papers; documents; pictures; audio; and any other content able to be published on the network 105. For example, in one implementation, content server 130a hosts a news website; content server 130b hosts a search website or is a search engine; and content server 130n host a video sharing website.

Figure 2:
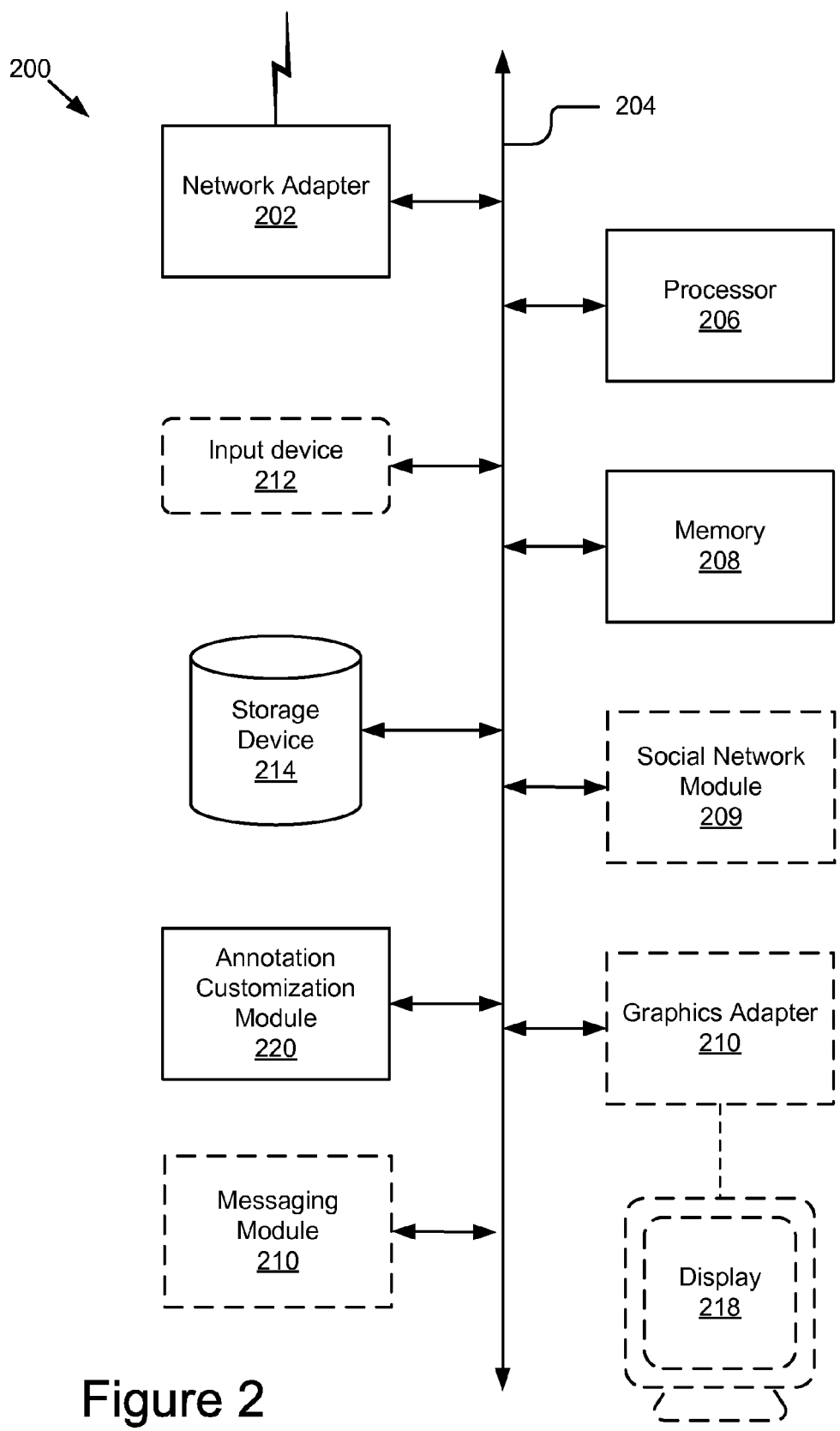
FIG. 2 is a block diagram of an example computing device in accordance with one implementation.

FIG. 2 is a block diagram of an example of a computing device 200 according to one implementation. In one implementation, the computing device 200 is the login server 101. In another implementation, the computing device is a content server 130. In yet another implementation, the computing device is a user device 115.

As illustrated in FIG. 2, the computing device 200 includes a network adapter 202 coupled to a bus 204. According to one implementation, also coupled to the bus 204 are at least one processor 206, a memory 208, a display 218 coupled to a graphics adapter 210, an input device 212, a storage device 214, and an annotation customization module 220. In one implementation, the functionality of the bus 204 is provided by an interconnecting chipset. In one implementation, the computing device 200 includes an optional social network module 209. In another implementation, the computing device 200 includes an optional messaging module 210.

The processor 206 may be any general-purpose processor. The processor 206 includes an arithmetic logic unit, a microprocessor, a general purpose controller or some other processor array to perform computations, provide electronic display signals to display 218. The processor 206 is coupled to the bus 204 for communication with the other components of the computing device 200. Processor 206 processes data signals and may include various computing architectures including a complex instruction set computer (CISC) architecture, a reduced instruction set computer (RISC) architecture, or an architecture implementing a combination of instruction sets. Although only a single processor 206 is shown in FIG. 2, multiple processors may be included. The computing device 200 also includes an operating system executable by the processor 206 such as but not limited to WINDOWS®, MacOS X, Android, or UNIX® based operating systems.

The memory 208 stores instructions and/or data that may be executed by processor 206. The memory 208 is coupled to the bus 204 for communication with the other components of the computing device 200. The instructions and/or data may include code for performing any and/or all of the techniques described herein. The memory 208 may be a dynamic random access memory (DRAM) device, a static random access memory (SRAM) device, flash memory or some other memory device known in the art. In one implementation, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis.

In one implementation, the computing device 200 contains an optional social network module 209. The social network module 209 is software and routines executable by the processor 206 to control the interaction between the computing device 200, storage device 214 and the user device 115. An implementation of the social network module 209 allows users 125 of user devices 115 to perform social functions between other users 125 of user devices 115 within the system 100.

In one implementation, the computing device 200 contains an optional messaging module 210. The messaging module 210 is software and routines executable by the processor 206 to control the interaction between the computing device 200, storage device 214 and the user devices 115. An implementation of the messaging module 210 allows users 125 of user devices 115 to exchange digital messages with other users 125 of user devices 115 within the system 100 creating a messaging network, e.g., an e-mail network. An e-mail network enables users 125 to exchange digital messages across the Internet or other computer networks.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for the processor 206 and includes one or more devices including a hard disk drive, a floppy disk drive, a CD-ROM device, a DVD-ROM device, a DVD-RAM device, a DVD-RW device, a flash memory device, or some other mass storage device known in the art. In one implementation, the storage device 214 is used to store user profiles and other information identifying users 125 of the system 100. In some implementations, such user data is stored in data storage 110. In one implementation, the storage device 214 is used to store user activities, including sharing activities, within the system 100. In some implementations, such user activities are stored in data storage 110.

The input device 212 may include a mouse, track ball, or other type of pointing device to input data into the computing device 200. The input device 212 may also include a keyboard, such as a QWERTY keyboard or soft keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the computing device 200 to a local or wide area network.

The annotation customization module 220 may be software and routines executable by the processor 206 to customize the display of a content item, e.g., an annotation, based at least in part on a user's sharing activity. An implementation of the annotation customization module 220 may be software and routines executable by the processor 206 to customize the display of a content item, e.g., an annotation, based at least in part on a user's sharing activity. Details describing the functionality and components of the annotation customization module 220 are explained in further detail below with regard to FIG. 3.

A computing device 200 can have different and/or other components than those shown in FIG. 2. In addition, the computing device 200 can lack certain illustrated components. In one implementation, the computing device 200 lacks an input device 212, graphics adapter 210, and/or display 218. Moreover, the storage device 214 can be local and/or remote from the computing device 200 (such as embodied within a storage area network (SAN)).

As is known in the art, the computing device 200 is adapted to execute computer program modules for providing functionality described herein. As used herein, the term "module" refers to computer program logic utilized to provide the specified functionality. Thus, a module can be implemented in hardware, firmware, and/or software. In one implementation, program modules are stored on the storage device 214, loaded into the memory 208, and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
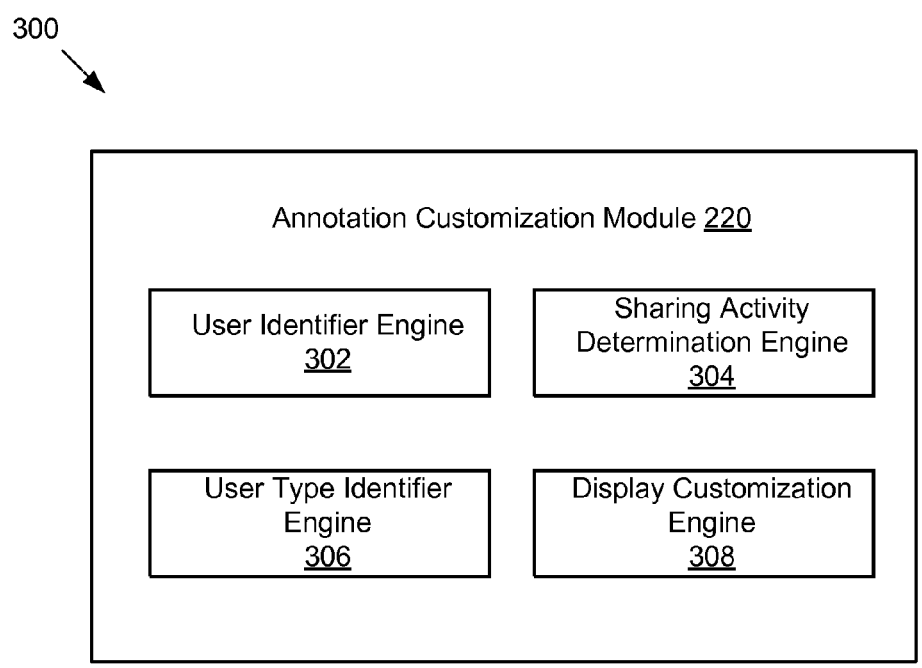
FIG. 3 is a block diagram illustrating an example annotation customization module according to one implementation.

Referring now to FIG. 3, an example of the annotation customization module 220 is shown in more detail according to one implementation. In one implementation, the annotation customization module 220 may be software and routines executable by the processor 206 to customize the display of a content item, e.g., an annotation, based at least in part on a user's sharing activity.

In one implementation, the annotation customization module 220 includes a user identifier engine 302, a sharing activity determination engine 304, a user type identifier engine 306 and a display customization engine 310.

The user identifier engine 302 may be software and routines executable by the processor 206 for identifying a user based on user-provided information or user activity. In one implementation, the user identifier engine 302 may be a set of instructions executable by a processor 206 to provide the functionality described below for identifying a user based on user-provided information or user activity. In another implementation, the user identifier engine 302 may be stored in memory of the computing device 200 and may be accessible and executable by the processor 206. In either implementation, the user identifier engine 302 may be adapted for cooperation and communication with the processor 206 and other components of the computing device 200.

Identifying a user, depending upon the implementation, can refer to ascertaining the identity of a user 125 (e.g., the user's name is John Smith or the user has username JSmith1) or differentiating one user 125a from another user 125b (e.g., AnonUser2345 from AnonUser2346).

In one implementation, the user identifier engine 302 may be communicatively coupled to, or included in, the user login server 101. In one such implementation, the user-provided information or user activity may include the user logging into an account. The user identifier engine 302 determines the user's 125 identity is that of the account owner when the user 125 successfully logs into the account. For example, the user 125 logs into the user login server 101 by providing the username JSmith1 and the correct password. The user identifier engine 302 identifies the user by username (JSmith1), or the user identifier engine 302 retrieves the name associated with the account from the storage device 214 and identifies the user by name (John Smith).

In one implementation, the user identifier engine 302 may be communicatively coupled to, or included in a content server 130. In one implementation, the user identifier engine 302 may be communicatively coupled to, or included in, a user device 115. In one implementation, the user-provided information or user activity, by way of example and not limitation, includes one or more of an IP address, device identification number ("device ID"), browser history, search history and activity on the content server 130. For example, if a content server 130 receives a request for content from two different IP addresses, the user identifier engine 302 identifies two users corresponding to the two different IP addresses. In one implementation, the user identifier engine 302 assigns a user ID to each of the IP addresses (e.g., AnonUser2345 for the user of the first IP address and AnonUser2346 for the user of the second IP address).

In one implementation, the user identifier engine 302 associates the user-provided information or user activity with the assigned user ID, e.g., the IP address, device ID, browser history or search history, in a user profile. In one implementation, the user-provided information or user activity of the user profile is used for further identification. For example, a content server 130 receives a first requests for content from a user 125. The user is assigned a user ID, User1234A, and the user's IP address and the user's browser history, which includes parenting and financial planning websites, are associated with the user ID in a user profile. The content server 130 then receives a second request for content from the IP address already associated with User1234A; however, the browser history associated with the second request includes teen magazine websites and the fan website of a band mostly enjoyed by teens, so the user identifier engine 302 identifies the second request for content as originating from a different user and assigns a second user ID, e.g., User 1234B, based on the differences in the browser histories. It will be recognized that other methods of identifying users exist and may be applied without departing from the teachings herein.

The sharing activity determination engine 304 may be software and routines executable by the processor 206 for determining a user's sharing activity. In one implementation, the sharing activity determination engine 304 may be a set of instructions executable by a processor 206 to provide the functionality described below for determining a user's sharing activity. In another implementation, the sharing activity determination engine 304 may be stored in the memory 208 of the computing device 200 and may be accessible and executable by the processor 206. In either implementation, the sharing activity determination engine 304 may be adapted for cooperation and communication with the processor 206 and other components of the computing device 200.

Sharing activity, by way of example and not limitation, includes one or more of indications of interest (e.g., endorsements); posting, reposting or embedding content on a blog or micro blog; and sending, or forwarding, content via e-mail or other digital message system. In one implementation, determining the user's sharing activity is determining a measure of the user's sharing activity. In one such implementation, the measure is the frequency of the user's sharing activity, i.e., the number times sharing activity occurred in a predetermined period (e.g., the preceding week, month, 3 sessions or 24 hours online). It will be recognized that any predetermined period may be used. In another implementation, the measure is the total number of times sharing activity has occurred.

In one implementation, the sharing activity determination engine 304 determines the user's sharing activity at least in part by receiving the user's responses to a questionnaire. For example, the user is asked and responds to one or more questions regarding how frequently he/she indicates approval of a content item (e.g., endorses something); posts, reposts or embeds content on a blog or micro blog; or sends, or forwards, content via e-mail or other digital message system.

In one implementation, the user's sharing activity is determined at least in part by the user's online activity. The user's online activity can include one or more of the number of content items consumed by the user, the content items consumed by the user, the amount of time the user spends online, the frequency of the user being online, what content the user bookmarked, how many content items are the subject of the user's sharing activity and which content items are the subject of the user's sharing activity.

In one implementation, the sharing activity determination engine 304 determines and (in some implementations) associates the user's online activity with the user's profile. For example, assume the annotation customization engine 220 is in a content server 130 that hosts an online newspaper website and the user identifier engine 302 has identified a user as "AnonUser2345." As AnonUser2345 selects and views articles (content) the sharing activity determination engine 304 determines how many articles AnonUser2345 views and how many of those articles he shares (e.g., by e-mailing the article to someone).

In another implementation, the user's activity is determined by a module and/or entity separate and distinct from the annotation customization module 220. For example, the other module could be a blog, micro blog, social network, or messaging module belonging to a blog, micro blog, social network or e-mail server, respectively. In one such implementation, the separate and distinct module and/or entity determines the online activity of the user and the sharing activity determination engine 304 is communicatively coupled to receive or retrieve the sharing activity. For example, assume a social network determines sharing activity data regarding the user's endorsements (sharing activity) and associates that data with the user's profile. The sharing activity determination engine 304 is communicatively coupled to retrieve that sharing activity data, e.g., how frequently the user endorses a piece of content, from the social network.

In one implementation, determining the user's sharing activity includes determining the user's sharing activity within a predefined context and identifying the user type is based at least in part on the user's sharing activity within the predefined context. In such implementations, sharing activity determination engine 304 determines the sharing activity within a certain context. For example, the sharing activity determination engine 304 may determine the user's sharing activity on a mobile device, or may determine the user's sharing activity associated with particular topics.

After the sharing activity determination engine 304 determines the user's sharing activity, the determined sharing activity may be sent to the user type identifier engine 306.

The user type identifier engine 306 may be software and routines executable by the processor 206 for identifying a user type based at least in part on the user's 125 sharing activity. In one implementation, the user type identifier engine 306 may be a set of instructions executable by a processor 206 to provide the functionality described below for identifying a user type based at least in part on the user's 125 sharing activity. In another implementation, the user type identifier engine 306 may be stored in memory 208 of the computing device 200 and may be accessible and executable by the processor 206. In either implementation, the user type identifier engine 306 may be adapted for cooperation and communication with the processor 206 and other components of the computing device 200.

In one implementation, there are two or more user types. In one such implementation, the two or more user types are based at least in part on the measure of the user's sharing frequency, specifically, the frequency of the user's 125 sharing activity, and the two or more user types include frequent sharers and infrequent sharers. It will be recognized that any number of user types can be created using criteria other than, or different from, the frequency of a user's 125 sharing activity.

In one implementation, the user type identifier engine 306 utilizes a threshold test to identify the user's type. For example, assume that a user participating in sharing activity more than once a week is a frequent sharer and assume that the sharing activity determination engine 304 determines the user 125 participated in sharing activity three times in the preceding week, the user type identifier engine 306 compares the user's sharing activity (3 times) to a predefined threshold value (1 time) and determines if the threshold is met. In this example, the threshold is met (because 3>1) and the user 125 is identified as a frequent sharer.

In one implementation, the user type identifier engine 306 utilizes aggregate statistics to identify a user type and associate the user with the user type. In one implementation, the threshold value of the threshold test is determined at least in part by aggregate statistics regarding user sharing activity. For example, assume that aggregate statistics establish that participating in sharing activity once, twice and three times a week are the $25^{th}$ percentile, $50^{th}$ percentile/median and $75^{th}$ percentile values, respectively, for sharing activity frequency, in one implementation, the user type identifier engine 306 compares a user's 125 frequency of sharing activity to these values and identifies the user 125 as a frequent sharer if the user's 125 sharing activity is higher than the $75^{th}$ percentile and identifies the user 125 as an infrequent sharer if the user's sharing activity is below the $25^{th}$ percentile.

In one implementation, the user type identifier engine 306 generates and stores the aggregate statistics used to create threshold values from the user 125 online activity data generated by the sharing activity determination engine 304. In another implementation, the aggregate statistics used are generated by the responses of users to a questionnaire. In one implementation, threshold values of user type are generated by statistical analysis of the aggregate statistics to determine what threshold values correlate to increased user engagement.

It will be recognized that other methods of identifying a user type may be applied without departing from the teaching herein. For example, requiring that a threshold be met for more than one type of sharing activity (e.g., frequent sharer only if the threshold is met for both indications of interest and re-postings on a micro blog), that the threshold be satisfied by at least one type of social activity (e.g., a user satisfying the threshold for sharing content through e-mail is a frequent sharer regardless of other sharing activity frequencies), hierarchy or weighting of different types of sharing activity (e.g., if frequent sharer based on indications of interest but infrequent sharer via e-mail, the user is identified as an infrequent sharer because e-mail weighted more heavily), or that the threshold be satisfied by the sum of a plurality of different sharing activities (e.g., a user's indications of interest and e-mail sharing do not meet the respective individual thresholds, but a threshold of total, or combined, sharing activity is met; therefore, the user is a frequent sharer).

After the user type identifier engine 306 identifies the user's type based at least in part on the user's sharing activity, the user's type may be sent to the display customization engine 308.

The display customization engine 308 may be software and routines executable by the processor 206 for customizing the display of content and/or annotations based at least in part on an analysmay be of the user's type. In one implementation, the display customization engine 308 may be a set of instructions executable by a processor 206 to customize the display of content and/or annotations based at least in part on the user's type. In another implementation, the display customization engine 308 may be stored in memory 208 of the computing device 200 and may be accessible and executable by the processor 206. In either implementation, the display customization engine 308 may be adapted for cooperation and communication with the processor 206 and other components of the computing device 200.

In one implementation, the display customization engine 308 modifies the annotations displayed to the user based at least in part on the user's type. In one such implementation, the visual impact, or prominence, of the annotation is modified based at least in part on the user's type. The visual impact, or prominence, of the annotation is determined by a number of factors including whether an annotation is present or not, the position/placement of the annotation, the size of the annotation, the color of the annotation, whether the annotation is animated, etc. For example, assume users engagement in users identified as frequent sharers is correlated with favorable endorsements more than other indications of interest, the endorsement icon and endorsement counter is, therefore, displayed larger and before other indications of interest.

In one implementation, the display customization engine 308 modifies the content items displayed to the user based at least in part on the user's type. For example, if infrequent sharers engage more when the content displayed has favorable annotations, in one implementation, only content with favorable annotations is displayed. In one implementation, the display customization engine 308 modifies the order of the content items displayed based at least in part on the user's type. For example, assume a first user identified as a frequent sharer and a second user identified as an infrequent sharer search for "Family Guy ipecac" on a website hosting video content, the display customization engine 308 displays the results to the first user in an order based purely on keyword relevance and displays the results to the second user in an order based on a combination of keyword relevance and popularity as indicated by associated annotations.

In one implementation, the display customization engine 308 customizes the display of content and/or annotations based at least in part on the user's type by using one or more guidelines. On example of a guideline is to not display annotations if a user is identified as a frequent sharer. In one implementation, the one or more guidelines are established at least in part by one or more research studies. In one implementation, the study utilizes user responses to a questionnaire. For example, assume a study found that users identified as infrequent sharers engage more if the content is accompanied by favorable annotations based on responses to a questionnaire, this finding would be turned into one or more guidelines, e.g., if the user is an infrequent sharer, display content associated with favorable annotations and display those favorable annotations prominently. Thus, in one implementation, the display customization engine 308 would customize an infrequent sharer's display to display only content items with favorable annotations and would display the annotations in a way that increases the annotations' visual impact based on the one or more guidelines.

In another implementation, the one or more guidelines are established at least in part by using data created by determining the online activity of users. As discussed above, in some implementations, the user's online activities are determined by the sharing activity determination module 304 or some other module and/or entity (e.g., a news website hosted by a content server 130) depending on the implementation. In one such implementation, the sharing activity determination engine 304 determines user online activity and associates the activity with the corresponding user profile. The display customization engine 308 generates a series of permutations or combinations of display formats (e.g., varying visual impact of annotations including the presence, size, color and position, varying the content items displayed). The display customization engine 308 then sends the different permutations or combinations to similar users, e.g., identified as the same type. For example, a first portion of users identified as infrequent sharers is shown content associated with favorable annotations but no annotations are displayed, a second portion of the users identified as infrequent sharers is shown the same content associated with favorable annotations but negative annotations are (falsely) displayed and a third portion of the users identified as an infrequent sharers is shown the same content associated with favorable annotations and the favorable annotations are displayed. The sharing activity determination engine 304 determines the users' subsequent online activity, specifically, the engagement of the first, second and third portions of users, which the sharing activity determination engine 304 associates with the corresponding user profiles. The display customization engine 308 retrieves subsequent user engagement data, aggregates the data and statistically determines what, if any, statistically significant impact each permutation or combinations of display had on user engagement. For example, if the third portion of users engaged with content 30% more content than the second portion of users and 10% than the first portion of users, the display customization engine 308 determines a guideline to display the annotations of content associated with favorable annotations to infrequent sharers. The preceding examples of permutations or combinations are meant to be illustrative rather than exhaustive. It will be recognized that many other permutations or combinations are possible and may be applied without departing form the teachings herein.

Figure 4:
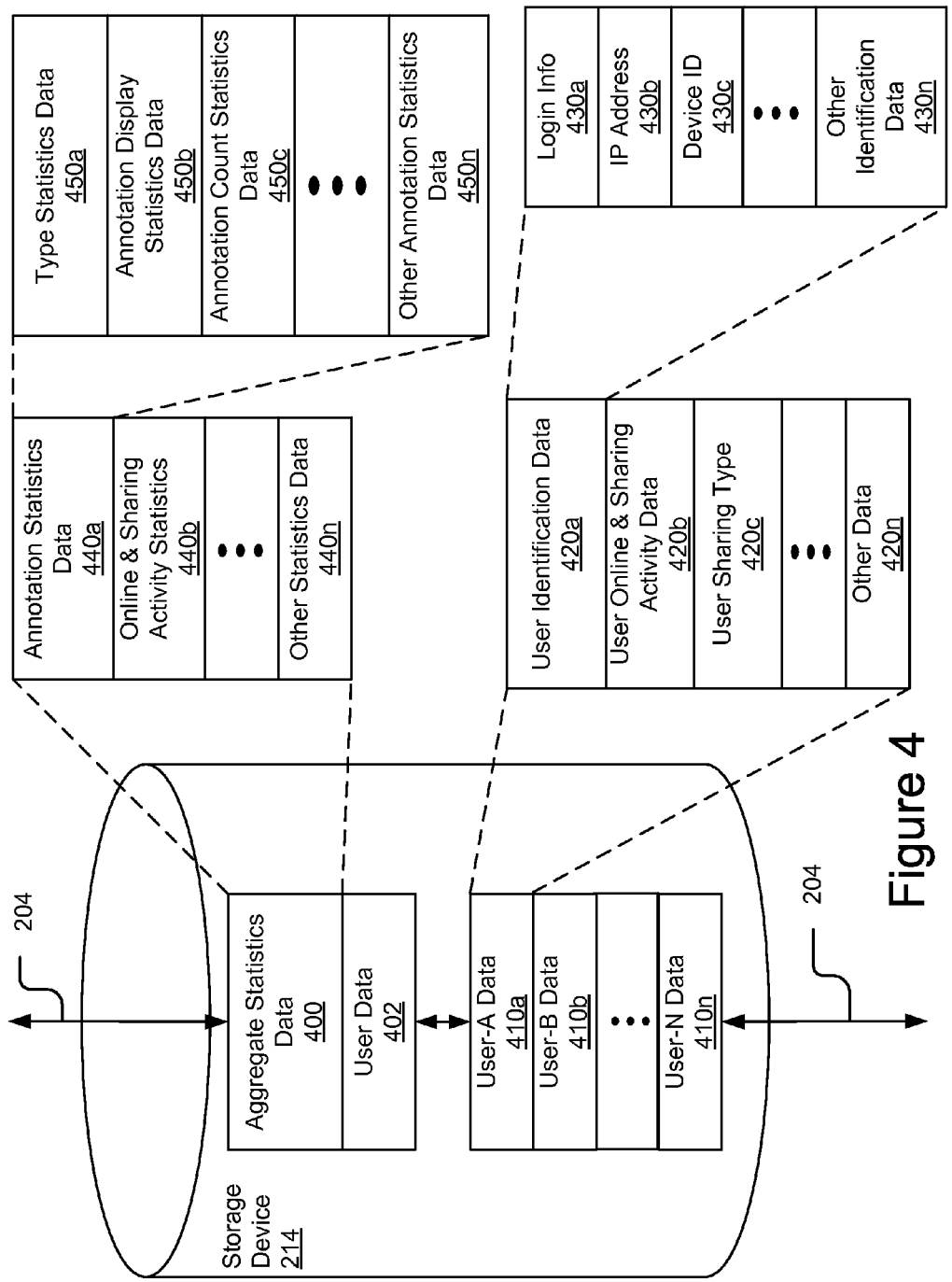
FIG. 4 illustrates an example storage device storing user data including data regarding the user's identity, online & sharing activity and aggregate statistics data according to one implementation.

FIG. 4 illustrates an example of a storage device 214 storing user aggregate statistics 400 data and user data 402 including data belonging to User-A 410a according to one implementation. User-A Data 410a may be a user profile according to one implementation. In this example, the User-A data 410a includes data regarding User-A's identification 420a and User-A's online & sharing activity 420b. User-A's identification data 420a includes user-provided information or user activity regarding one or more of User-A's login information 430a, IP address 430b, device ID 430c, and other identification information 430n (e.g., search and/or browser history data) associated with User-A and used by the user identifier module 302 to identify a user. User-A's online & sharing activity data 420b may be associated with User-A, in one implementation, by the sharing activity determination engine 304 and used by the user type identifier engine 306 to identify User-A's type, which may be subsequently associated with User-A in the user sharing type 420c.

In the illustrated example, the user aggregate statistics data 400 includes statistics data regarding the users 125 of the system 100 including user annotation statistics 440a, user online & sharing activity statistics 440b and other statistics data 440n according to one implementation. The user annotation statistics 440a include one or more statistics regarding type statistics 450a, annotation display statistics 450b and annotation count statistics 450c. Type statistics 450a includes, for example, statistics used to determine the threshold value(s) used by the user type identifier 306. Annotation display statistics 450b includes, for example, statistics how the display, i.e., the visual impact or prominence, of annotations effects the engagement of each user type Annotation count statistics 450c, includes, for example, statistics regarding when an annotation becomes a favorable annotation. For example, how many indications of interest must be present before a user of a first type is affected by the annotation. According to one implementation, one or more aggregate statistics 400 are used as guidelines by the display customization engine 308 to customize the display of content and/or annotations based at least in part on the user's type.

In some implementations, a user may be prompted to explicitly allow data collection. In some implementations, the user may opt in/out of participating in such data collection activities. Furthermore, in some implementations, the collected data can be anonymized prior to performing the analysis to obtain the various statistical patterns described above.

Figure 5A:
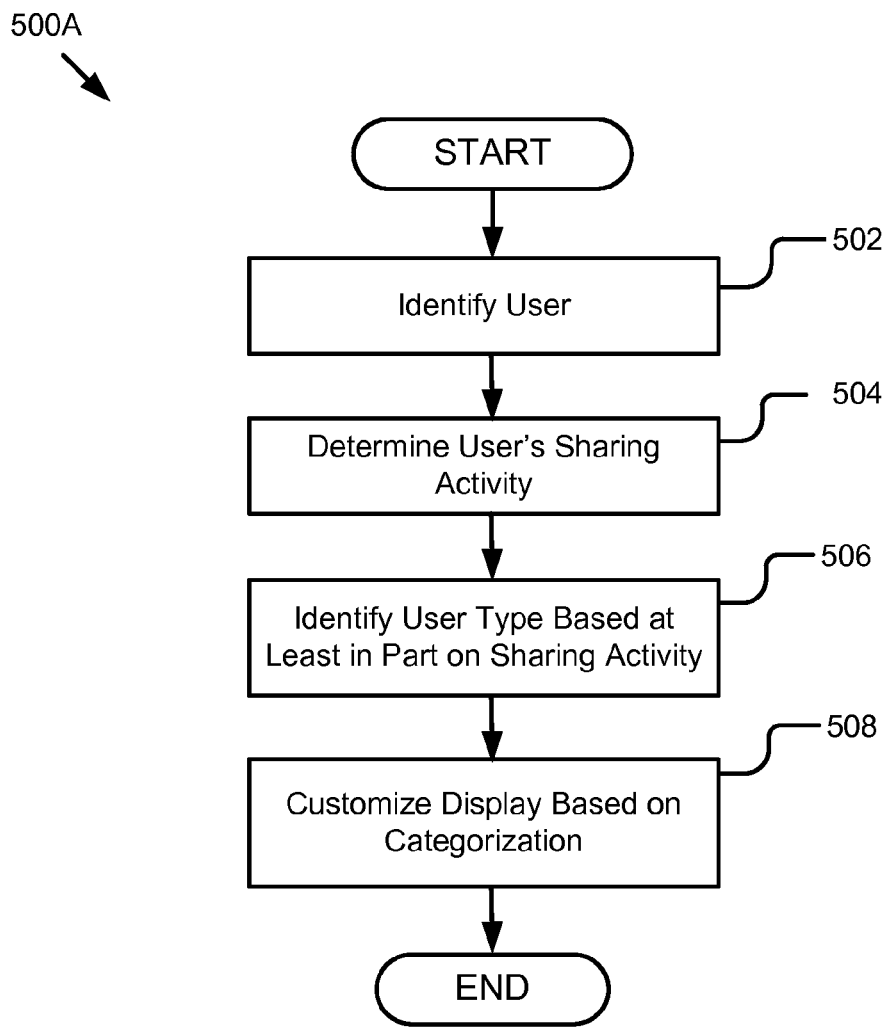
FIG. 5A is a flow chart illustrating an example method for customizing the display of a content item, e.g., an annotation, based at least in part on a user's sharing activity according to one implementation.

Referring now to FIG. 5A, a flow chart illustrating an example of a method 500A for customizing the display of a content item, e.g., an annotation, based at least in part on the user's sharing activity is shown according to one implementation.

The user identifier engine 302 of the annotation customization module 220 identifies the user based on user-provided information or user activity. As discussed above, identifying a user, depending upon the implementation, can refer to ascertaining the identity of a user 125 (e.g., the user's name is John Smith or the user has username JSmith1) or differentiating one user 125a from another user 125b (e.g., AnonUser2345 from AnonUser2346). Also as discussed above, the user may be identified in any number of ways.

Figure 6:
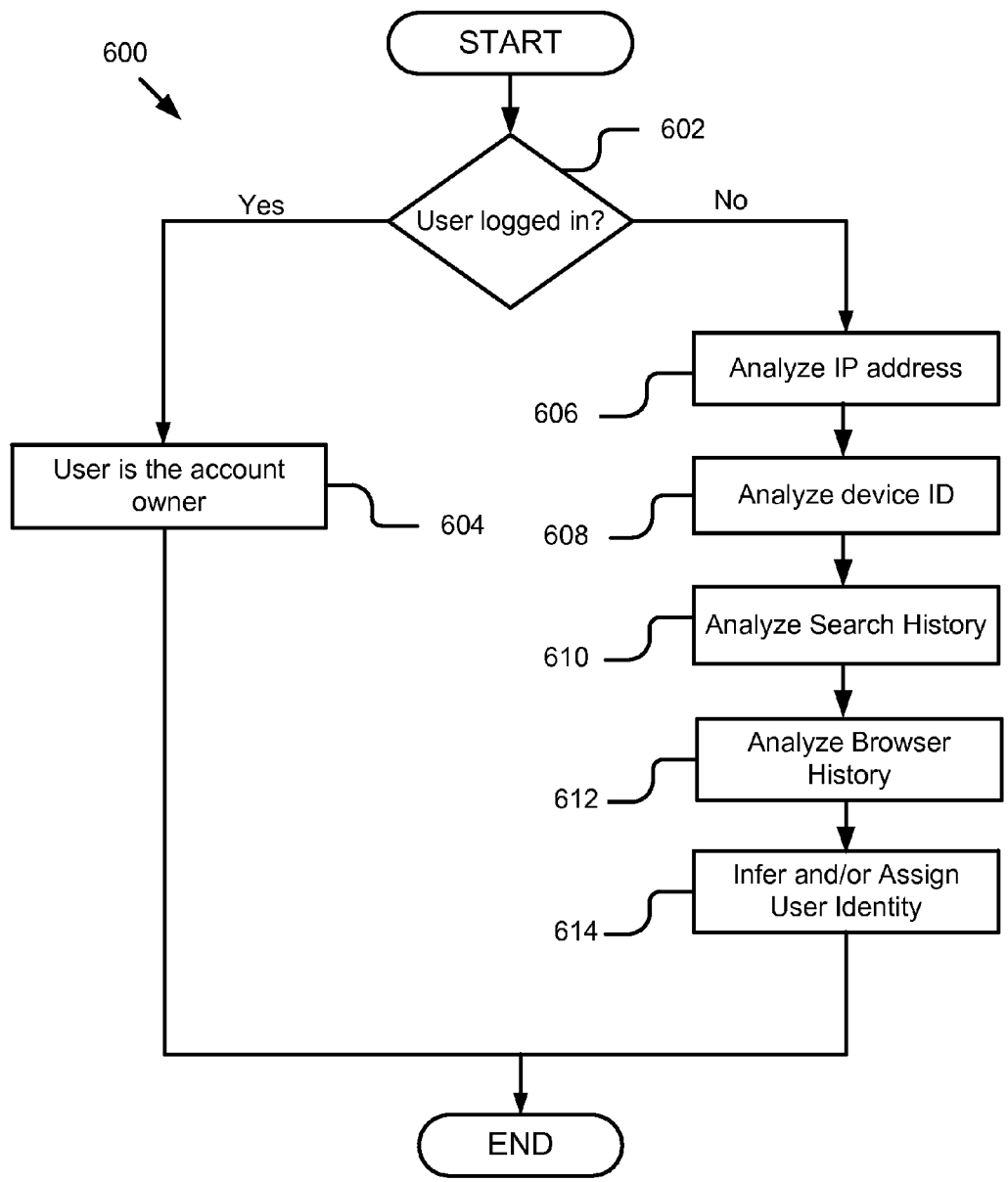
FIG. 6 is a flowchart illustrating an example method for identifying a user according to one implementation.

Referring now to FIG. 6, a flow chart illustrating an example method 600 for identifying a user is shown in accordance with one implementation. It will be recognized that this is just one implementation. Other implementations may use any of the methods in FIG. 6 alone or in combination. Other implementations may also include methods in addition to or different from those of FIG. 6. The user identifier engine 304 determines 602 if the user is logged in. If the user is logged into the user login server 101 (602—Yes), the user identifier engine 304 identifies 604 the user as the account owner. If the user is not logged into the user login server 101 (602—No), the user identifier engine 302 retrieves/receives and analyzes the user's IP address 606, the user's device ID 608, the user's search history 610 and the user's browser history 612. The user identifier engine 302 then infers and/or assigns 614 a user identity based on this analysis. For example, the user identifier engine 302 infers 614 that two users share a computer based on identical IP address 606 and device ID 608 (same computer) and disparate browser history 610 and search history 612 (different users). The user identifier engine 302 assigns 614 each of the two users an identity, for example, the user IDs AnonUser1234a and AnonUser1234B.

Referring again to FIG. 5A, in one implementation, once the user has been identified 502, the sharing activity determination engine 304 determines the user's sharing activity 504. As discussed above, sharing activity, by way of example and not limitation, includes one or more of indications of interest (e.g., endorsements); posting, reposting or embedding content on a blog or micro blog; and sending, or forwarding, content via e-mail or other digital message system. In one implementation, determining the user's sharing activity is determining a measure of the user's sharing activity. In one such implementation, the measure is the frequency of the user's sharing activity, i.e., the number times sharing activity occurred in a predetermined period of time (e.g., the preceding week, month, 3 sessions or 24 hours online). It will be recognized that any predetermined amount of time may be used. In another implementation, the measure is the total number of times sharing activity has occurred.

Figure 7:
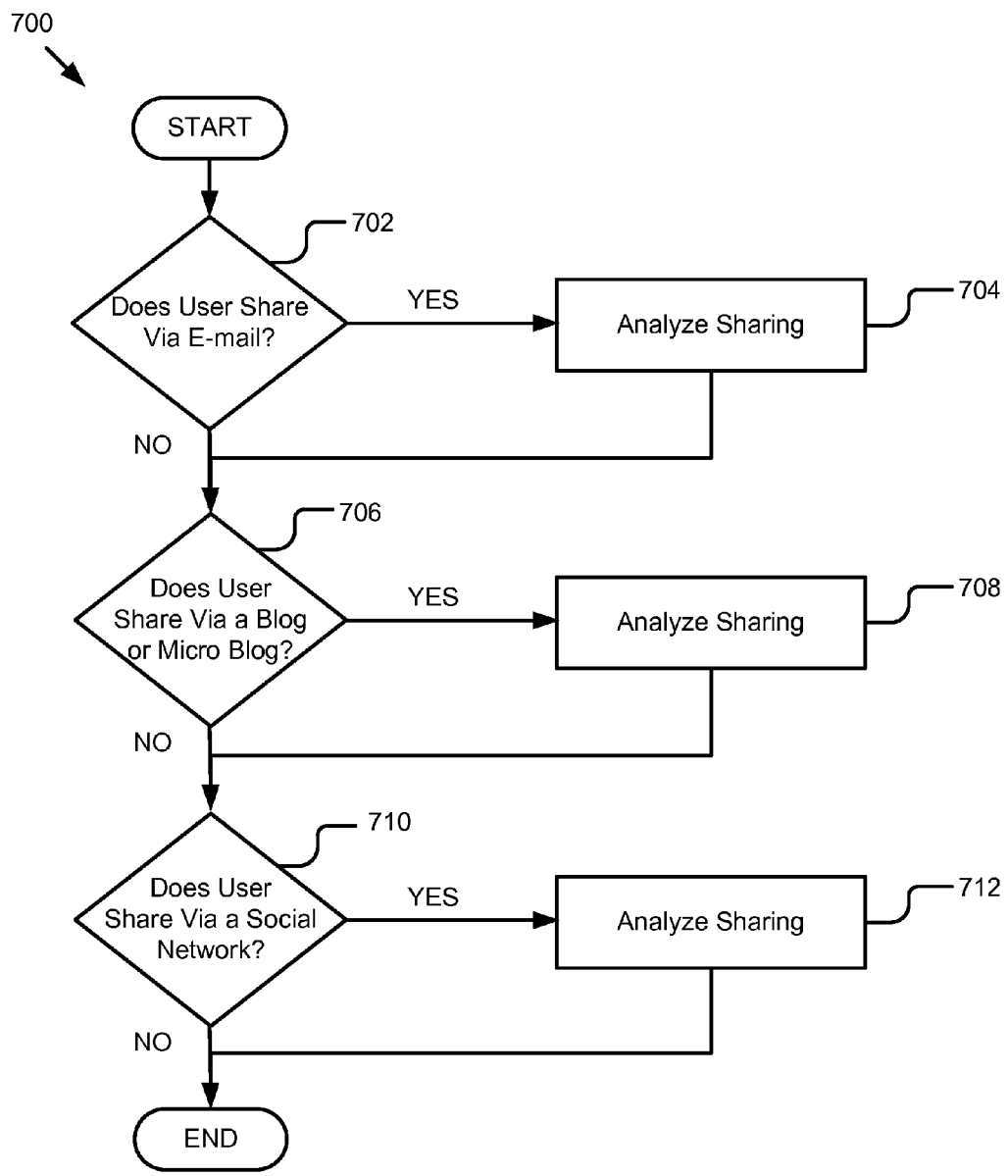
FIG. 7 is a flowchart illustrating an example method for determining a user's sharing activity according to one implementation.

Referring now to FIG. 7, a flow chart illustrating an example method 700 for determining a user's sharing activity is shown in accordance with one implementation. It will be recognized that this is just one implementation. Other implementations may use any of the methods in FIG. 7 alone or in combination. Other implementations may also include methods in addition to or different from those of FIG. 7. The sharing activity determination engine 304 determines 702 if the user shared content via e-mail (e.g., sending or forwarding content). If the user shared content via e-mail (702—Yes), the sharing activity determination engine 304 analyzes 704 that sharing activity before proceeding to step 706. For example, the total number of content items consumed, the total number of content items shared, the type of content items shared, the frequency of sharing the content items, the annotations of the content items shared, etc. If the user did not share content via e-mail (702—No), the sharing activity determination engine 304 proceeds directly to step 706.

At step 706, the sharing activity determination engine 304 determines if the user shared content via a blog or micro blog (e.g., by posting, reposting or embedding content). If the user shared content via a blog or micro blog (706—Yes), the sharing activity determination engine 304 analyzes 708 that sharing activity before proceeding to step 710. For example, the total number of content items consumed, the total number of content items shared, the type of content items shared, the frequency of sharing the content items, the annotations of the content items shared, etc. If the user did not share content blog or micro blog (706—No), the sharing activity determination engine 304 proceeds directly to step 710.

At step 710, the sharing activity determination engine 304 determines if the user shared content via a social network (e.g., by indicating approval of content). If the user shared content via a social network (710—Yes), the sharing activity determination engine 304 analyzes 712 that sharing activity before stopping. For example, the total number of content items consumed, the total number of content items shared, the type of content items shared, the frequency of sharing the content items, the annotations of the content items shared, etc. If the user did not share content via a social network (710—No), the sharing activity determination engine 304 stops.

Referring again to FIG. 5A, once the user's sharing activity is determined 504 by the sharing activity determination engine 304, the user type identifier engine 306 uses the sharing activity of the user to identify 506 a user type based at least in part on the sharing activity of the user and associate the user type with the user. The display customization engine 308 customizes the display of a content item, e.g., an annotation based at least in part on the user type. As described above, the customization can include, for example, modifying the visual impact of the annotation, the content items displayed and/or their order, etc.

Figure 5B:
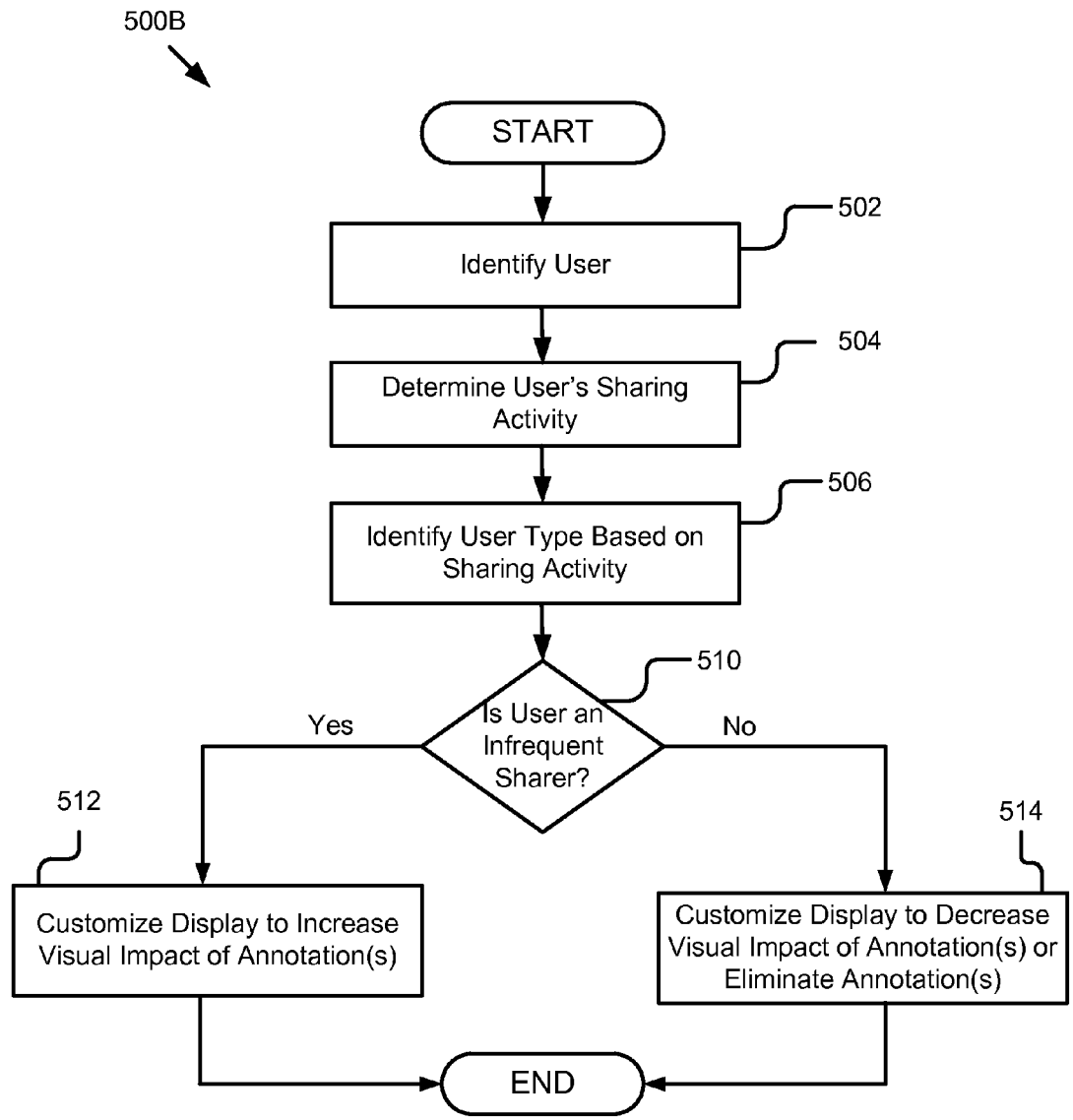
FIG. 5B is a flow chart illustrating another example method for customizing the display of a content item, e.g., an annotation, based at least in part on a user's sharing activity according to one implementation.

Referring now to FIG. 5B, a flow chart illustrating an example of a method 500B for customizing the display of display of a content item, e.g., an annotation, based at least in part on the user's sharing activity is shown according to one implementation. Similar to method 500A of FIG. 5A, the user is identified 502, the user's sharing activity is determined 504 and the user's type is identified 506. However, according to method 500B, the user types include infrequent sharers. The customization display engine 308 determines 510 whether a user is identified as in infrequent sharer. If the user is identified as an infrequent sharer (510—Yes), the customization display engine 308 customizes 512 the display to increase the visual impact of annotations based on a guideline that infrequent sharer engagement is affected by annotations. However, if the user is not identified as an infrequent sharer (510—No), the customization display engine 308 customizes 514 the display to decrease the visual impact of annotations or eliminate annotations based on a guideline that the engagement of frequent sharers, or non-infrequent sharers, is not affected by annotations.

Graphical User Interface

Figure 8A:
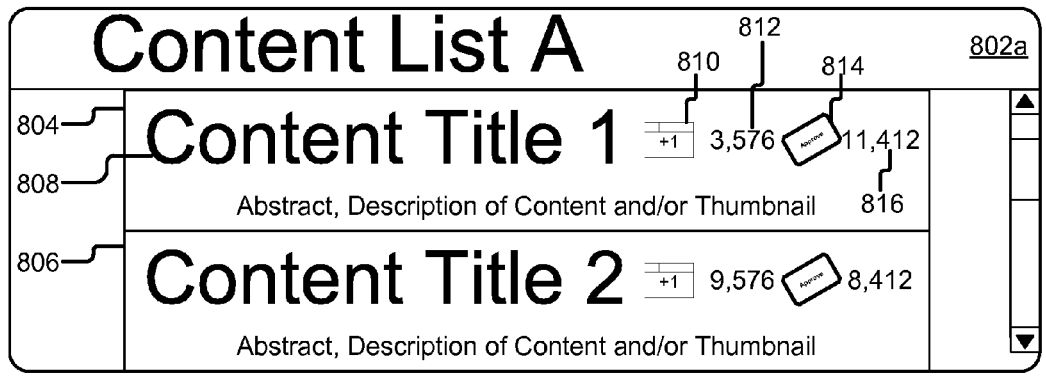
FIG. 8A is a graphic representation of an example of a user interface where the display of content and/or annotations has been customized based at least in part on an analysis of the user's sharing activity according to one implementation.

FIG. 8A-D are graphic representations illustrating examples of how the display of a content item, e.g., an annotation, is customized based at least in part on a user's sharing activity according to various implementations. FIG. 8A includes a content list 802a including a first content item 804 and a second content item 806. In the illustrated implementation, each content item 804/806 includes a title 808, a first indication of interest 810, a first indication of interest count 812, a second indication of interest 814 and a second indication of interest count 816. In one implementation, the pairing of an indication of interest 810/814 and its count 812/816 is a type of annotation. In one implementation, content list 802a is the default display of content items and annotations, i.e., if a user cannot be identified or does not have a type.

Figure 8B:
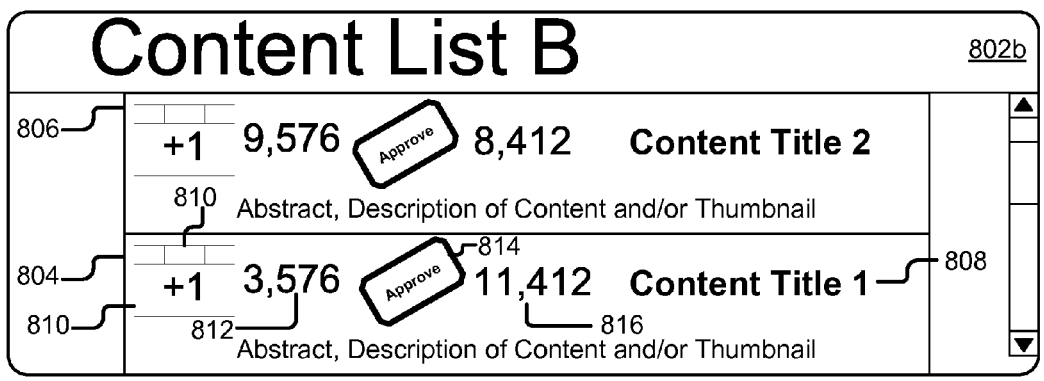
FIG. 8B is a graphic representation of another example of a user interface where the display of content and/or annotations has been customized based at least in part on an analysis of the user's sharing activity according to one implementation.

FIG. 8B illustrates an example of a customized display of a content list 902b according to one implementation. The user has been identified as a user type that is affected by annotations. For example, assume the user is an infrequent sharer, which is a user whose engagement with content increases if the content is associated with favorable annotations, and the more favorable the annotations associated with the content the more likely the user is to engage. The display generated for the user, therefore, increased the prominence, or visual impact, of the annotations 810 & 812, 814 & 816 by increasing their size and placing them before the title 808 of the content item 804/806 enabling the user to more easily utilize the annotations 810 & 812, 814 & 816 to identify content worth engaging with. Additionally, the order of the content items 804, 806 has been modified to display the second content item 806 above the first content item 804. In one implementation, the modified order is because the second content item 806 has a higher total indication of interest count (9,576+8,412=17,988) than the first content item 804 (3,576+11,412=14,988), which is a more favorable annotation according to one implementation. Thus, the content item the user is most likely to engage with is displayed first.

Figure 8C:
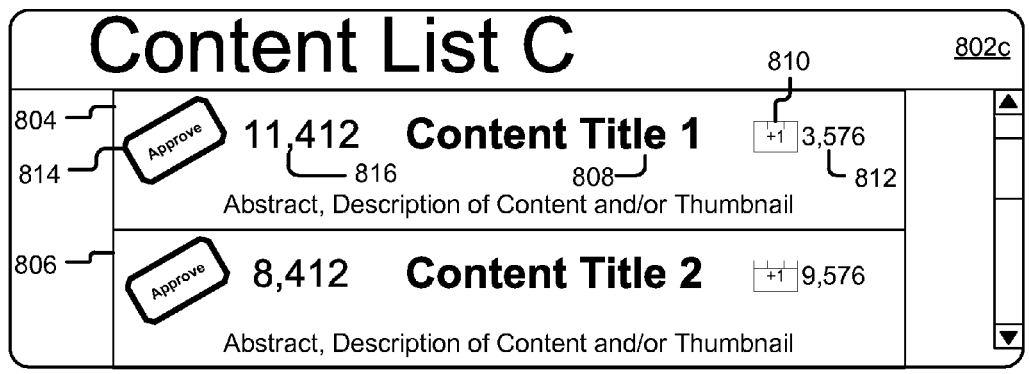
FIG. 8C is a graphic representation of another example of a user interface where the display of content and/or annotations has been customized based at least in part on an analysis of the user's sharing activity according to one implementation.

FIG. 8C illustrates another example of a customized display of a content list 902c according to one implementation. The user has been identified as a user type whose engagement is affected by a specific type of annotation. For example, assume the user is an infrequent sharer, which is a user whose engagement increases if the content is associated with a favorable second indication of interest annotation 814 & 816. The display generated for the user, therefore, increased the prominence, or visual impact, of the second indication of interest annotation 814 & 816 by increasing their size and placing the annotation 814 & 816 before the title 808 of the content item 804/806 enabling the user to more easily utilize the second indication of interest annotation 814 & 816 to identify content worth engaging with. As illustrated, the first indication of interest annotation 810 & 812 is still displayed, but at a default size and in a default position. In other implementations, the first indication of interest annotation 810 & 812 is not displayed. Additionally, the order of content items 804, 806 is modified to display content items 804, 806 in order of most favorable second indication of interest annotation 814 & 816, which, in one implementation, is the content item (in this case the first content item 804) having the highest second indication of interest count 816 first followed by the next highest and so forth. Thus, the content item the user is most likely to engage with is displayed first.

Figure 8D:
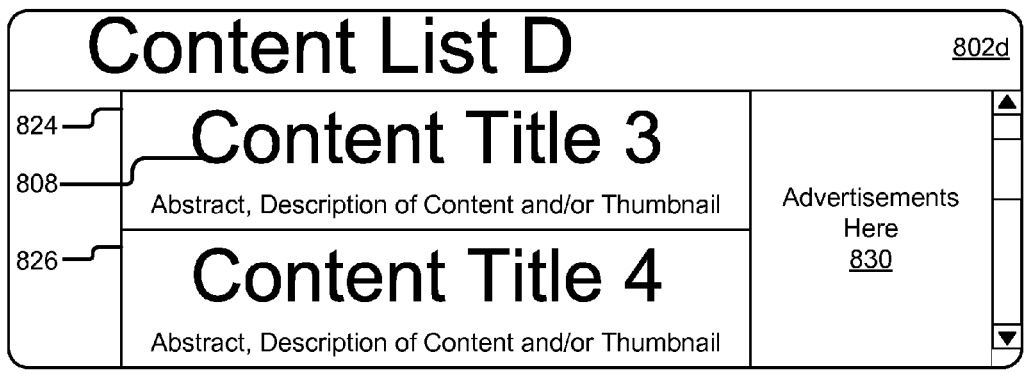
FIG. 8D is a graphic representation of yet another example of a user interface where the display of content and/or annotations has been customized based at least in part on an analysis of the user's sharing activity according to one implementation.

FIG. 8D illustrates yet another example of a customized display of a content list 902d according to one implementation. The user has been identified as a user type whose engagement level is unaffected by annotations. For example, assume the user is identified as a frequent sharer, which is a user that engages with content without regard to associated annotations, e.g., there is no discernable pattern or correlation between the content the user engages with and the annotations associated with the content. The display generated for the user, therefore, decreases the prominence, or visual impact, of the annotations by eliminating them entirely. As illustrated, the elimination of the annotations creates room for a larger title 808 and additional content or information that might engage the user, or generate revenue for the publisher (e.g., advertisements 830). Additionally, the content items displayed are different, i.e., a third content item 824 and a fourth content item 826. In one implementation, the content items displayed are different because annotations are irrelevant in determining the content to display. For example, in returning the search results for a content item, content list D 802*d* displays the results ranked based on the results of a keyword search of metadata associated with content items, while content lists A-C 802*a-c* changed the rank or content items displayed based on associated annotations. In one implementation, this may be because the user of content list D 802*d* engages with content based on relevance (in this case determined by keyword) while the users of content lists A-C 802*a-c* engage with content based in part on the annotations associated with the content. Thus, the content item the user is most likely to engage with are displayed first.

The foregoing description of the implementations has been presented for the purposes of illustration and description. It is not intended to be exhaustive or to limit the implementations to the precise form disclosed. Many modifications and variations are possible in light of the above teaching. It is intended that the scope of the implementations be limited not by this detailed description, but rather by the claims of this application. As will be understood by those familiar with the art, the implementations may take other specific forms without departing from the spirit or essential characteristics thereof. Likewise, the particular naming and division of the modules, routines, features, attributes, methodologies and other aspects are not mandatory or significant, and the mechanisms that implement one implementation or its features may have different names, divisions and/or formats. Furthermore, as will be apparent to one of ordinary skill in the relevant art, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill. Additionally, the implementations are in no way limited to implementation in any specific programming language, or for any specific operating system or environment. Accordingly, the disclosure of the present technology is intended to be illustrative, but not limiting, of the scope, which is set forth in the following claims.

What is claimed is:

1. A computer-implemented method comprising:
    identifying a user based on user-provided information or user activity;
    determining the user's sharing activity;
    identifying a user type based at least in part on the user's sharing activity and associating the user type with the user, wherein the user type is one of two or more user types related to a frequency of the user's sharing activity including a frequent sharer type and an infrequent sharer type; and
    customizing and providing for display one or more of a content item and modifying an annotation indicating popularity and associated with the content item displayed to the user to change the visual impact by modifying one from the group of location, color, size and animation of the annotation based at least in part on the user's user type.

2. The method of claim 1, wherein the user-provided information or user activity comprises the user successfully logging into an account and the user is identified as the account's owner.

3. The method of claim 1, wherein the user-provided information or user activity includes one or more of the user's IP address, the device ID of the user's computing device, the user's browser history and the user's search history.

4. The method of claim 1, wherein the user's sharing activity is one or more of the user's indications of interest; posting, reposting or embedding content on a blog or micro blog; and sending, or forwarding, content via e-mail or other digital messaging system.

5. The method of claim 1, wherein the user's sharing activity is determined at least in part by the user's responses to a questionnaire.

6. The method of claim 1, wherein the user's sharing activity is determined at least in part by the user's online activity, which is determined and analyzed.

7. The method of claim 1, wherein identifying the user type further comprises:
    applying a threshold test to the user's sharing activity; and
    associating the user with the type based at least in part on the measure of the user's sharing activity and responsive to the result of the threshold test.

8. The method of claim 1, wherein customizing one or more of the content item and the annotation displayed to the user based on the user's user type further comprises one or more of:
    providing for display a content item to the user based in part on the annotation, or lack of annotation, associated with the content item;
    modifying the display order of content items; and
    modifying the display of an annotation to increase, or decrease, the annotation's visual impact when displayed to the user.

9. The method of claim 1, wherein determining the user's sharing activity includes determining the user's sharing activity within a predefined context and identifying the user type is based at least in part on the user's sharing activity within the predefined context.

10. A system comprising:
    a processor and at least one module, executable by the processor, the at least one module including instructions when executed by the processor, cause the processor to perform steps comprising:
    identifying a user based on user-provided information or user activity;
    determining the user's sharing activity;
    identifying a user type based at least in part on the user's sharing activity and associating the user type with the user, wherein the user type is one of two or more user types related to a frequency of the user's sharing activity including a frequent sharer type and an infrequent sharer type and; and
    customizing and providing for display one or more of a content item and modifying an annotation indicating popularity and associated with the content item displayed to the user to change the visual impact by modifying one from the group of location, color, size and animation of the annotation based at least in part on the user's user type.

11. The system of claim 10, wherein the user-provided information or user activity comprises the user successfully logging into an account and the user is identified as the account's owner.

12. The system of claim 10, wherein the user-provided information or user activity includes one or more of the user's IP address, the device ID of the user's computing device, the user's browser history and the user's search history.

13. The system of claim 10, wherein the user's sharing activity is one or more of the user's indications of interest; posting, or reposting, content on a blog or micro blog; and sending, or forwarding, content via e-mail or other digital messaging system.

14. The system of claim 10, wherein the user's sharing activity is determined at least in part by the user's responses to a questionnaire.

15. The system of claim 10, wherein the user's sharing activity is determined at least in part by the user's online activity, which is determined and analyzed.

16. The system of claim 10, wherein the instructions for categorizing the user further comprises instructions for:
  applying a threshold test to the user's sharing activity; and
  associating the user with the type based at least in part on the measure of the user's sharing activity and responsive to the result of the threshold test.

17. The system of claim 10, wherein the instructions for customizing one or more of the content item and the annotation displayed to the user further comprises instructions for one or more of:
  providing for display a content item to the user based in part on the annotation, or lack of annotation, associated with the content item;
  modifying the display order of content items; and
  modifying the display of an annotation to increase, or decrease, the annotation's visual impact when displayed to the user.

18. The system of claim 10, wherein determining the user's sharing activity includes determining the user's sharing activity within a predefined context and identifying the user type is based at least in part on the user's sharing activity within the predefined context.

19. A computer program product comprising a non-transitory computer usable medium including instructions that, when executed by a computer, cause the computer to perform steps comprising:
  identifying a user based on user-provided information or user activity;
  determining the user's sharing activity;
  identifying a user type based at least in part on the user's sharing activity and associating the user type with the user, wherein the user type is one of two or more user types related to a frequency of the user's sharing activity including a frequent sharer type and an infrequent sharer type; and
  customizing and providing for display one or more of a content item and modifying an annotation indicating popularity and associated with the content item displayed to the user to change the visual impact by modifying one from the group of location, color, size and animation of the annotation based at least in part on the user's user type.

* * * * *